US009611981B2

(12) United States Patent
Billig et al.

(10) Patent No.: US 9,611,981 B2
(45) Date of Patent: Apr. 4, 2017

(54) METHODS AND SYSTEMS FOR A RAIL VEHICLE INCLUDING A SOURCE OF GASEOUS NATURAL GAS

(71) Applicant: General Electric Company, Schenectady, NY (US)

(72) Inventors: Ronald Gene Billig, Hermitage, PA (US); Taral Shah, Wattsburg, PA (US)

(73) Assignee: General Electric Corporation, Schenectady, NY (US)

( * ) Notice: Subject to any disclaimer, the term of this patent is extended or adjusted under 35 U.S.C. 154(b) by 183 days.

(21) Appl. No.: 13/956,410

(22) Filed: Aug. 1, 2013

(65) Prior Publication Data

US 2014/0033738 A1 Feb. 6, 2014

Related U.S. Application Data

(60) Provisional application No. 61/678,191, filed on Aug. 1, 2012.

(51) Int. Cl.

| B61C 7/04 | (2006.01) |
|---|---|
| B61C 17/06 | (2006.01) |
| B60L 1/00 | (2006.01) |
| F17C 7/00 | (2006.01) |
| B61C 5/00 | (2006.01) |
| B61C 17/02 | (2006.01) |
| B61C 17/12 | (2006.01) |

(52) U.S. Cl.
CPC ............... *F17C 7/00* (2013.01); *B61C 5/00* (2013.01); *B61C 7/04* (2013.01); *B61C 17/02* (2013.01); *B61C 17/12* (2013.01); *Y02T 30/16* (2013.01)

(58) Field of Classification Search
CPC .... B61C 3/00; B61C 5/00; B61C 7/04; B60L 1/00; B60L 1/003
USPC ........... 105/26.05, 27, 35, 49, 50, 61.5, 62.1
See application file for complete search history.

(56) References Cited

U.S. PATENT DOCUMENTS

| 5,421,161 A | 6/1995 | Gustafson |
| 5,441,234 A | 8/1995 | White et al. |
| 5,590,535 A | 1/1997 | Rhoades |
| 5,887,567 A * | 3/1999 | White ...................... B61C 5/00 123/294 |
| 2011/0067390 A1 | 3/2011 | Cook |
| 2012/0042961 A1* | 2/2012 | Anderson ............. B60K 15/00 137/172 |
| 2012/0085260 A1 | 4/2012 | Nichini |
| 2012/0085459 A1 | 4/2012 | Nichini |
| 2012/0090729 A1 | 4/2012 | Nichini |
| 2014/0034151 A1* | 2/2014 | Foege ..................... B61C 17/02 137/345 |

* cited by examiner

*Primary Examiner* — R. J. McCarry, Jr.
(74) *Attorney, Agent, or Firm* — John A. Kramer; Global Patent Operation

(57) ABSTRACT

Various methods and systems are provided for supplying gaseous natural gas to a rail vehicle. In one embodiment, a method of receiving fuel for use by a first vehicle comprises sending a request from the first vehicle to a remote liquid fuel container to convert a portion of the fuel in the liquid fuel container that is in a first, liquid phase from the first, liquid phase to a second, gaseous phase.

19 Claims, 5 Drawing Sheets

METHODS AND SYSTEMS FOR A RAIL VEHICLE INCLUDING A SOURCE OF GASEOUS NATURAL GAS

CROSS-REFERENCE TO RELATED APPLICATIONS

This application claims priority to U.S. Provisional Application No. 61/678,191, filed Aug. 1, 2012, which is hereby incorporated by reference herein in its entirety.

FIELD

Embodiments of the subject matter disclosed herein relate to a rail vehicle, and related methods for supplying fuel to an engine of the rail vehicle.

BACKGROUND

Locomotives (or other vehicles) typically include a prime mover that is powered by a fuel source to generate mechanical energy. In one example of a locomotive, mechanical energy generated by the prime mover may be converted to electrical energy that is used to power traction motors and other components and systems of the locomotive. In some examples, the prime mover may be a combustion engine that is fueled by diesel, gasoline, or other liquid petroleum distillates. In other examples the engine may additionally or alternatively utilize a gaseous fuel, such as natural gas.

In light of its favorable energy content, liquefied natural gas (LNG) may be used as a fuel source for a locomotive prime mover. Particularly for long-haul applications, it may also be desirable to utilize a tender car, also known as a fuel tender, for carrying one or more LNG storage tanks. Prior to injection into a locomotive's natural gas-fueled engine, LNG is typically vaporized into gaseous natural gas (CNG). Such vaporization is often accomplished by heating the LNG with a heat source.

In some examples such a heat source may take the form of a heat exchanger on board the locomotive. In these examples the LNG may be transferred from the tender car to the heat exchanger on the locomotive across an interface between the tender car and the locomotive. Such an interface, however, requires suitable cryogenic hosing, cryogenic coupling components, and associated design constraints and maintenance requirements. Transferring LNG across such an interface also creates the potential for LNG leaks.

In other examples, a heat exchanger may be located on board the tender car. Heated cooling fluid from the locomotive engine may be transferred from the locomotive to the heat exchanger on the tender car across an interface. However, as with transferring LNG across an interface, this configuration requires additional insulated hosing and coupling components that present design challenges and risks. Additionally, LNG storage tanks typically generate boil-off gas that may accumulate in the tank. To avoid excess pressure build up, such boil-off gas is typically vented from the storage tanks to atmosphere. Such venting of natural gas may raise environmental concerns.

The locomotive engine may also enter an idle mode when power for the locomotive propulsion system is not required. Nevertheless, instead of entering a shutdown mode, the locomotive engine may continue to idle to generate electricity needed by components and/or systems on board the locomotive. Such idling may produce undesirable exhaust emissions and reduce overall operating efficiencies.

BRIEF DESCRIPTION OF THE INVENTION

In one embodiment, a method of receiving fuel for use by a first vehicle comprises sending a request from the first vehicle to a remote liquid fuel container to convert a portion of the fuel in the liquid fuel container that is in a first, liquid phase from the first, liquid phase to a second, gaseous phase. The remote liquid fuel container may be on a fuel tender coupled to the first vehicle. The fuel tender may further include a regasification unit for converting liquid natural gas from the liquid fuel container to gaseous natural gas. An engine on board the fuel tender may provide heat to the regasification unit for converting the liquid natural gas to gaseous natural gas. In this way, liquid natural gas and heated fluid do not pass from the fuel tender to the first vehicle, thereby decreasing the amount of insulated hoses and specialty components traversing the fuel tender and first vehicle.

It should be understood that the brief description above is provided to introduce in simplified form a selection of concepts that are further described in the detailed description. It is not meant to identify key or essential features of the subject matter.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
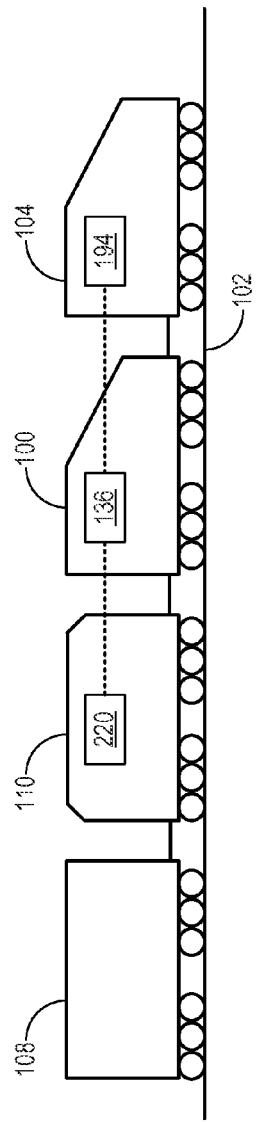
FIG. 1 shows a schematic diagram of two locomotives, a fuel tender, and a freight car according to an embodiment of the present disclosure.
Figure 2:
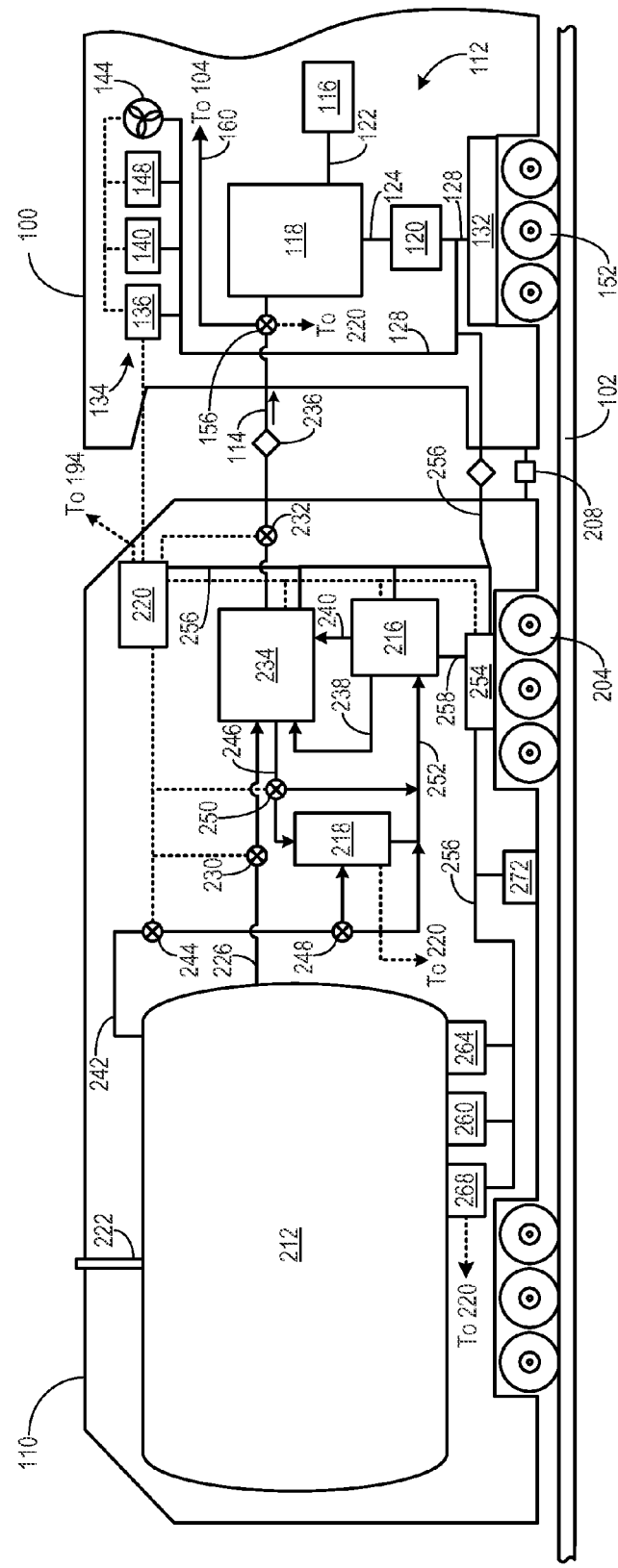
FIG. 2 shows a more detailed view of an exemplary embodiment of a fuel tender and a portion of a natural gas-fueled locomotive according to an embodiment of the present disclosure.
Figure 3:
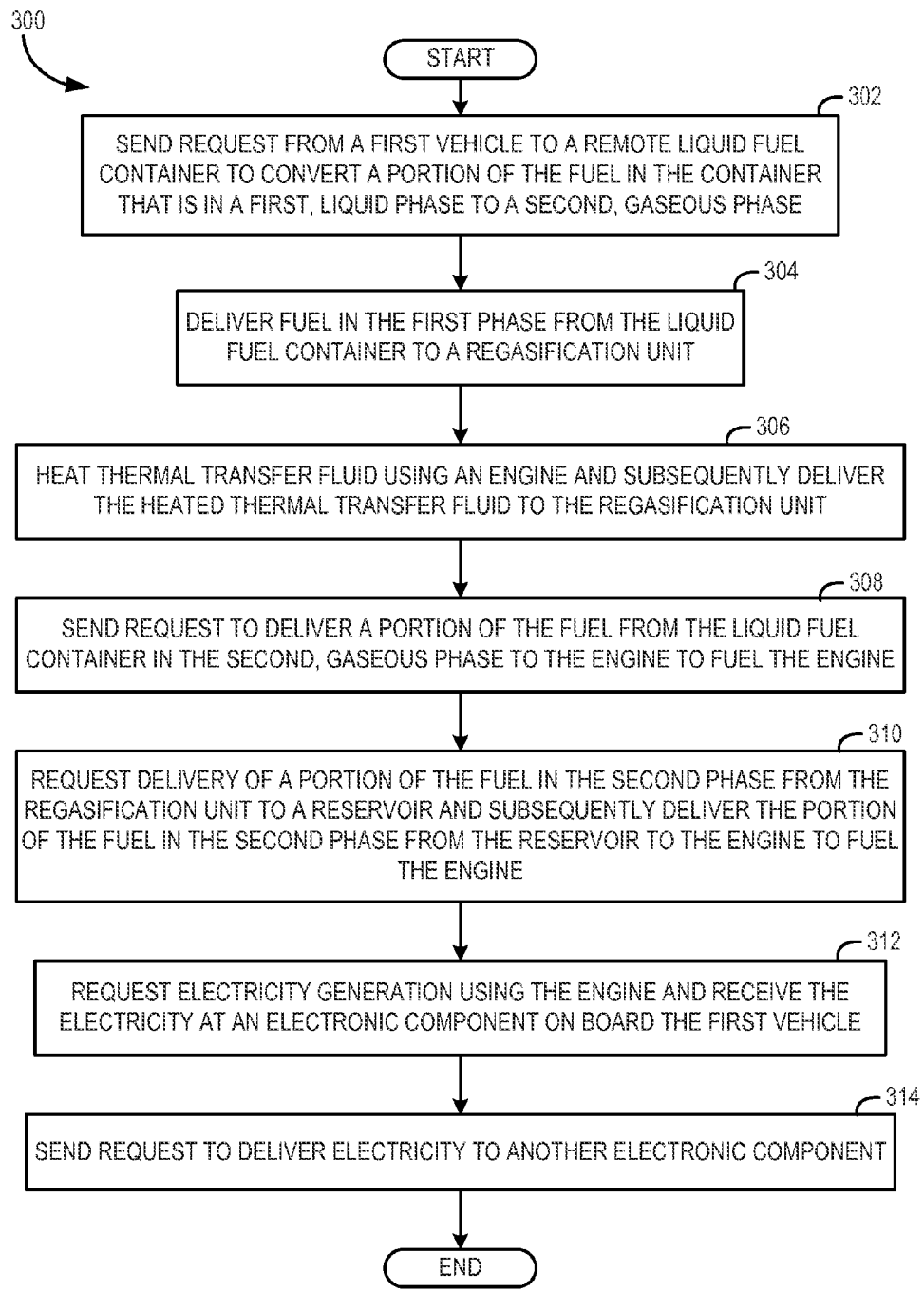
FIG. 3 shows a high level flow chart of a method for receiving fuel for use by a vehicle according to an embodiment of the present disclosure.
Figure 4:
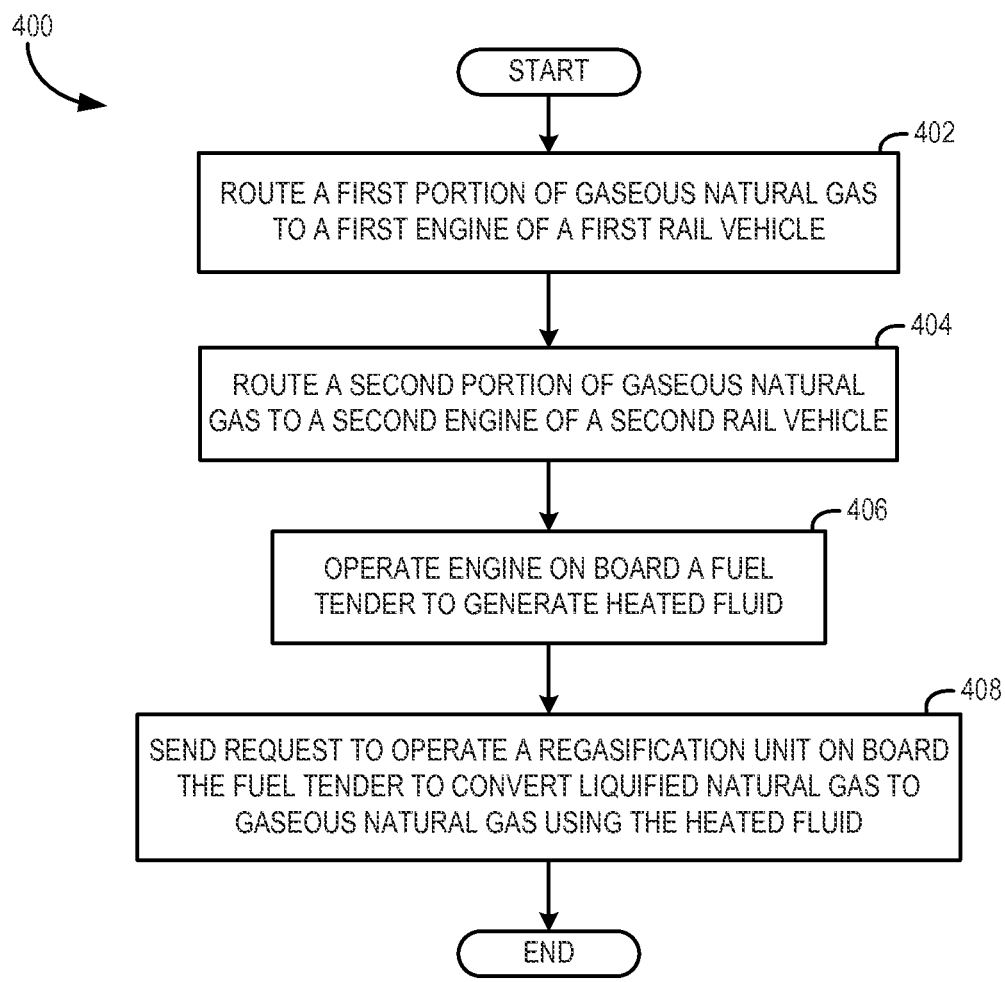
FIG. 4 shows a high level flow chart of a method for a rail vehicle according to an embodiment of the present disclosure.

The following description relates to various embodiments of controlling a rail vehicle. Specifically, the rail vehicle may receive gaseous natural gas to power a multi-fuel engine on board the rail vehicle and/or electrical energy to power electronic components on board the rail vehicle. The rail vehicle may receive the gaseous natural gas and electrical energy from a remote liquid fuel container (e.g., a liquid fuel container located off-board the rail vehicle) and a natural gas-fueled engine, respectively, both the liquid fuel container and the natural gas-fueled engine being off board the rail vehicle. In one example, the liquid fuel container and the natural gas-fueled engine are on board a fuel tender coupled to the rail vehicle, as shown at FIGS. 1-2. As described in more detail below, in some embodiments the rail vehicle may send signals or requests to the fuel tender to store liquefied natural gas (LNG) and convert the LNG to gaseous natural gas. A natural gas-fueled engine on board the rail vehicle (e.g., locomotive) may then receive the gaseous natural gas from the fuel tender. In other embodiments, other fuels including but not limited to biogas, hydrogen, or a combination thereof, may be utilized. FIGS. 3-4 present example methods for receiving gaseous natural gas converted from LNG at the rail vehicle. In response to signals from the rail vehicle, the natural gas-fueled engine on board the fuel tender may be operated to produce electrical energy. Methods for generating and supplying electrical energy to the rail vehicle are presented at FIGS. 5-6.

FIG. 1 shows a schematic diagram of a first locomotive 100 removably coupled to a second locomotive 104 and to a fuel tender 110 according to the present disclosure. (Although locomotives are illustrated in the embodiment of FIG. 1 and other embodiments, such embodiments are applicable to rail vehicles more generally, that is, the locomotives could be other types of rail vehicles such as self-propelled mining/ore carts, self-propelled freight cars, or the like.) The fuel tender 110 is shown removably coupled to a freight car 108. It will be appreciated that additional fuel tenders, freight cars, locomotives, and/or other rail vehicles may also be removably connected to the freight car 108 and/or the second locomotive 104. It will also be appreciated that the order of the various rail vehicles shown in FIG. 1 may be modified.

The first and second locomotives 100 and 104, fuel tender 110, and freight car 108 are configured to run on a rail 102 (or set of rails) via a plurality of wheels. In FIG. 1, the fuel tender 110 is positioned behind the first locomotive 100 and removably connected to the freight car 108. In other configurations, the fuel tender 110 may be positioned in front of the locomotive 100 and/or may not be connected to the freight car 108 or other rail car. In still other configurations, one or more other rail vehicles may be located between the fuel tender 110 and the locomotive 100.

In one example the first locomotive 100 and second locomotive 104 are powered for propulsion, while the fuel tender 110 and freight car 108 are non-powered for propulsion. It will be appreciated that in other examples one or more of the fuel tender 110 and freight car 108 may also be powered for propulsion by, for example, one or more traction motors.

Additionally, FIG. 1 shows a tender controller 220 on board the fuel tender 110, a first locomotive controller 136 on board the first locomotive 100, and a second locomotive controller 194 on board the second locomotive 104. As described further below, the first locomotive controller 136 controls operation of a primary engine 118 and the tender controller 220 controls operation of the fuel tender 110. However, the first locomotive controller 136 may send signals and/or requests (e.g., commands) to the tender controller 220 regarding operation of the fuel tender 110. For example, the first locomotive controller 136 may send a request to the tender controller 220 of the fuel tender 110 to convert liquid natural gas to gaseous natural gas (or to convert another fuel in fuel tender from a first, liquid phase to a second, gaseous phase) and send the gaseous natural gas via one or more fuel lines to an engine of the first locomotive 100 (e.g., the primary engine 118), as described further below. Further, the first locomotive controller 136 may include instructions stored thereon (e.g., within a memory of the controller) for sending a plurality of requests to the tender controller 220 and to components on board the fuel tender 110. The tender controller 220 may then control actuators and/or components on board the fuel tender 110 based on the requests sent from the first locomotive controller 136 on board the first locomotive 100. As shown schematically in FIG. 1 by way of the dotted lines, the tender controller 220, first locomotive controller 136, and second locomotive controller 194 all communicate electronically with one another.

Turning now to FIG. 2, the first locomotive 100 (or other rail vehicle) includes an engine system 112 that comprises the primary engine 118, which has a plurality of cylinders. The primary engine 118 may be referred to herein as the locomotive engine. In one embodiment, each cylinder is configured to have at least one gaseous fuel injector and at least one liquid fuel injector. In the depicted example, the first locomotive 100 is configured as a locomotive powered by the engine system 112 that operates with various fuels, such as a first fuel and a second fuel. (That is, in embodiments, the engine system is operable by the first fuel by itself, and is also operable by the second fuel by itself, with the first and second fuels being stored in separate respective fuel containers. In other embodiments, alternatively of additionally, the engine system may be operable by the first and second fuels co-mixed, and/or otherwise by the first and second fuels concurrently during an engine cycle, e.g., during an engine cycle first a portion of the first fuel is provided into a cylinder, and then a portion of the second fuel is provided into the cylinder.) The fuels may include a liquid fuel, such as diesel fuel, an alternative fuel, and/or a gaseous fuel, or combinations thereof. In one example, the primary engine 118 is a dual fuel engine, such as a gas turbine, compression ignition engine, or spark ignition engine, a first fuel is gaseous natural gas that is received from the fuel tender 110 via fluidic coupling 114 (e.g., fuel line), and a second fuel is diesel fuel received from a diesel storage tank 116 via fluidic coupling 122 on board the first locomotive 100. While engine system 112 is configured in one embodiment herein as a multi-fuel engine operating with diesel fuel and natural gas, in other examples engine system 112 may use various combinations of fuels other than diesel and natural gas.

The primary engine 118 is configured to generate a torque that is transmitted to a power conversion unit 120 along a drive shaft 124. The power conversion unit 120 is configured to convert the torque into electrical energy that is delivered via electrical bus 128 to at least one traction motor 132 and to a variety of downstream electrical components in the first locomotive 100. Such components may include, but are not limited to, compressors 140, blowers 144, batteries 148, an electronics control system 134 comprising one or more controllers 136, shutoff valves, pressure regulators, radiators, lights, on-board monitoring systems, displays, climate controls (not shown), and the like.

Based on the nature of the generated electrical output, the electrical bus 128 may be a direct current (DC) bus (as depicted) or an alternating current (AC) bus. In one example the power conversion unit 120 includes an alternator (not shown) that is connected in series to one or more rectifiers (not shown) that convert the alternator's electrical output to DC electrical power prior to transmission along the electrical bus 128. The alternator may include, for example, a high-speed generator, a generator machine whose stator flux is synchronous to the rotor flux, or an asynchronous machine.

Based on the configuration of a downstream electrical component receiving power from the electrical bus 128, one or more inverters may be configured to invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The traction motor 132 receives electrical power from the power conversion unit 120 and is coupled to one or more axles/driving wheels 152. In this manner, the traction motor 132 is configured to drive the axles/driving wheels 152 along the rail 102. It should be appreciated that the number of sets of axles/driving wheels 152 may vary, and that one or more traction motors 132 may be provided for each set of axles/driving wheels. The traction motor 132 may be an AC motor. Accordingly, an inverter paired with the traction motor 132 may convert DC input to an appropriate AC input, such as a three-phase AC input, for subsequent use by the traction motor. In other non-limiting embodiments, traction motor 132 may be a DC motor directly employing the output of the power conversion unit 120 after rectification and transmission along the DC bus 128.

One example of a locomotive configuration includes one inverter/traction motor 132 pair per axle/driving wheel 152. Traction motor 132 may also be configured to act as a generator for providing dynamic braking to brake the first locomotive 100. In particular, during dynamic braking, the traction motor may provide torque in a direction that is opposite from the rolling direction, thereby generating electricity that is dissipated as heat by resistors (not shown) connected to the electrical bus 128.

The first locomotive controller 136 on board the first locomotive 100 controls the primary engine 118 by sending commands to various engine control hardware components such as inverters, alternators, relays, fuel injectors, fuel pumps (not shown), or the like. As described further below, in one example, the first locomotive controller 136 also monitors locomotive operating parameters in active operation, idle and shutdown states. Such parameters may include, but are not limited to, manifold air temperature (MAT), ambient temperature, engine oil temperature, compressor air pressure, main air reserve pressure, battery voltage, a battery state of charge, brake cylinder pressure, or the like. The first locomotive controller 136 further includes computer readable storage media (not shown) including code for enabling on-board monitoring and control of rail vehicle operation.

The first locomotive controller 136, while overseeing control and management of the primary engine 118 and other locomotive components, may be configured to receive signals from a variety of engine sensors, as further described herein. The first locomotive controller 136 may utilize such signals to determine operating parameters and operating conditions, and correspondingly adjust various engine actuators to control operation of the first locomotive 100. For example, the first locomotive controller 136 may receive signals from various engine sensors including, but not limited to, engine speed, engine load, boost pressure, exhaust pressure, ambient pressure, exhaust temperature, or the like. Correspondingly, the first locomotive controller 136 may control the locomotive 100 by sending commands to various components such as fraction motors, alternators, cylinder valves, throttles, or the like. As described further below, the first locomotive controller 136 at least partially controls operation of the fuel tender 110 by sending commands (e.g., requests) to the tender controller 220 on board the fuel tender. For example, the commands sent to the tender controller 220 may include commands for controlling various components on board the fuel tender such as a regasification unit 234, a LNG storage tank 212, or the like.

In one example, the computer readable storage media configured in the first locomotive controller 136 may execute code to auto-stop or auto-start the primary engine 118 by enabling, for example, an Automatic Engine Start/Stop (AESS) control system routine. As discussed in more detail below, the first locomotive controller 136 also communicates with the tender controller 220 on board the fuel tender 110 to, for example, request delivery of gaseous natural gas for the primary engine 118. As shown in FIGS. 1-2, the first locomotive controller 136 also communicates with the second locomotive controller 194 in the second locomotive 104 to, for example, coordinate pass-through delivery of gaseous natural gas from the fuel tender 110 to a natural-gas fueled engine in the second locomotive 104. The computer readable storage media configured in the first locomotive controller 136 may execute code to appropriately transmit and receive such communications.

With continued reference to FIG. 2, the fuel tender 110 is removably coupled to the first locomotive 100 and includes axles/wheels 204 configured to travel along rail 102. In the depicted example, the fuel tender 110 includes six pairs of axles/wheels 204. The fuel tender 110 further includes a mechanical coupling mechanism 208 that removably couples the fuel tender to the first locomotive 100 for linked movement thereof. In other examples, the fuel tender 110 may include a second coupling mechanism (not shown) that may removably couple the fuel tender to another rail vehicle, such as the freight car 108.

The fuel tender 110 is configured to carry one or more fuel storage tanks In one embodiment, as shown in FIG. 2, the fuel tender 110 includes an on-board cryogenic LNG storage tank 212 for storing LNG. In one example, the LNG storage tank 212 may take the form of a vacuum jacketed pressure vessel that stores LNG at pressures ranging from approximately 50 kPa to approximately 1,700 kPa. It will be appreciated that to maintain LNG in a liquid state, the LNG may be stored at a temperature of approximately −260 degrees Celsius or lower. In some examples, as shown in FIG. 2, the fuel tender 110 includes a cryogenic unit 268 for helping maintain the LNG within desired temperature and pressure ranges. In other example, the fuel tender 110 may not include the cryogenic unit 268.

Even with efficient insulation and cryogenic refrigeration equipment, heat typically leaks into the LNG storage tank 212 and causes vaporization of portions of the LNG into boil-off gas. As described in more detail below, in one example such boil-off gas may be used to power an engine 216 located on board the fuel tender 110 (an "on-board" engine 216). For purposes of this description, an "on-board" component, device, or other structure means that the component or device is physically located on the vehicle being described. For example, with respect to the fuel tender 110, a component or structure physically located on the fuel tender is on board the fuel tender, including when the fuel tender is coupled to a locomotive or other rail vehicle and when the fuel tender is not coupled to a locomotive or other rail vehicle.

In one example, as shown in FIG. 2, portions of such boil-off gas accumulating in the LNG storage tank 212 are also delivered to and stored in an on-board reservoir 218 that supplies gaseous natural gas to the on-board engine 216, as discussed in more detail below. In alternate examples, the fuel tender 110 may not include the reservoir 218. It will also be appreciated that the storage tank 212 may have various sizes and configurations and may be removable from the fuel tender 110. Further, as shown in FIG. 2, the storage tank 212 is configured to receive LNG from an external refueling station via port 222. In alternate examples, the storage tank 212 may revive LNG through another port or location on the storage tank 212.

The LNG storage tank 212 supplies LNG via cryogenic LNG fluidic coupling 226 and one or more valves 230 to a regasification unit 234. The regasification unit 234 converts the LNG into gaseous natural gas, i.e., vaporizes the LNG, by the application of heat to the LNG. The gaseous natural gas is then delivered to the primary engine 118 of the first locomotive 100 to power the primary engine 118. As shown in FIG. 2, the gaseous natural gas is delivered to the primary engine 118 via fluidic coupling 114 and one or more control valves 232. In some examples, as shown in FIG. 2, a pass-through control valve 156 is provided to direct at least a portion of the gaseous natural gas through the first locomotive 100 via a pass through fluidic coupling 160 to the second locomotive 104. In this manner, a natural gas-fueled engine in the second locomotive 104 may be powered by gaseous natural gas from the fuel tender 110. In alternate examples, there may not be a control valve 156 and gaseous natural gas may only be delivered to the first locomotive 100. In yet another example, additional control valves may be positioned in the gaseous natural gas fluidic coupling 114 to direct gaseous natural gas to additional locomotives or rail cars.

The gaseous natural gas fluidic coupling 114 further includes a detachable interface coupling 236 that enables the fuel tender 110 to be decoupled from the locomotive 100. It will also be appreciated that in other embodiments the pass-through control valve 156 may be located on board the fuel tender 110, along with suitable fluidic couplings to pass through fluidic coupling 160.

It will be appreciated that by converting the LNG to gaseous natural gas on board the fuel tender 110 and supplying gaseous natural gas to the primary engine 118, standard gaseous natural gas conduit and interface couplings may be utilized between the fuel tender and the locomotive 100. Advantageously, such a configuration avoids costly cryogenic tubing and interface couplings, and the corresponding design challenges, that would otherwise be required for transferring LNG between the fuel tender 110 and the locomotive 100. Additionally, using such standard, low pressure gaseous natural gas fluidic and interface couplings eliminates the possibility of LNG leaks between the fuel tender 110 and locomotive 100.

Additionally, and in another advantage that may be realized in the practice of some embodiments disclosed herein, the on-board engine 216 may serve as a heat source that provides heated fluid to the regasification unit 234. Examples of suitable fluids that may be used include, but are not limited to, water, glycols, salt solutions, alcohols, intake air, exhaust gas, and mixtures of two or more of the foregoing. In one example, the on-board engine 216 may comprise a natural gas-fueled combustion engine that includes a heat exchanger, such as a radiator, that generates heated liquid. As shown in FIG. 2, the on-board engine 216 is fluidly coupled to the regasification unit 234 via fluidic coupling 238 and supplies the heated liquid to the regasification unit via the fluidic coupling 238. The regasification unit 234 then utilizes the heated liquid to heat the LNG and convert the LNG to gaseous natural gas.

In other non-limiting embodiments, the heated fluid generated by the on-board engine 216 comprises air and/or exhaust gas resulting from combustion within the on-board engine. In one example, the on-board engine 216 supplies heated exhaust gas to the regasification unit 234 via fluidic coupling 240. The regasification unit 234 then utilizes the heated exhaust gas to heat the LNG and convert the LNG to gaseous natural gas. In another example, the on-board engine 216 may receive ambient air that is heated and supplied to the regasification unit 234 via fluidic coupling 240. The regasification unit 234 may then utilize the heated air to heat the LNG and convert the LNG to gaseous natural gas.

In other examples, the on-board engine 216 may generate both heated liquid and heated gas, and may supply both heated liquid and heated gas to the regasification unit 234. It will also be appreciated that in other examples the on-board engine 216 may utilize one or more alternative fuels such as, for example, diesel, gasoline, biogas, propane, or the like.

In an advantage that may be realized in the practice of some embodiments disclosed herein, by utilizing the on-board engine 216 as a heat source to provide heated fluid to the regasification unit 234, and by converting the LNG to gaseous natural gas on board the fuel tender 110, the fuel tender is liquidly isolated from the first locomotive 100. For purposes of this description, "liquidly isolated" means that neither LNG nor heated fluid is transferred from the fuel tender 110 to the first locomotive 100, or vice versa. Advantageously, such configurations avoid the possibility of LNG and/or heated fluid leaks and other malfunctions that could occur in the transfer of LNG and/or heated fluid between the fuel tender 110 and the first locomotive 100.

In another advantage that may be realized in the practice of some embodiments disclosed herein, the on-board engine 216 may comprise a natural-gas fueled engine that is powered by boil-off gas supplied from the LNG storage tank 212. In one non-limiting example depicted in FIG. 2, the on-board engine 216 receives boil-off gas from the storage tank 212 via boil-off gas fluidic coupling 242, one or more control valves 244 and 248, and fluidic coupling 252. Advantageously, in this configuration, boil-off gas from the storage tank 212 is used to power the on-board engine 216, and thereby avoid venting such gas to atmosphere. In this manner, the described configuration makes productive use of such boil-off gas while also avoiding potential environmental issues associated with venting the gas.

In another non-limiting example depicted in FIG. 2, the reservoir 218 on board the fuel tender 110 receives boil-off gas from the storage tank 212 via boil-off gas fluidic coupling 242 and control valve 248. The reservoir 218 is fluidly coupled to the on-board engine 216 via fluidic coupling 252. Advantageously, the reservoir 218 provides a ready source of gaseous natural gas for starting the on-board engine 216 and for operating the on-board engine 216.

In another non-limiting example and as depicted in FIG. 2, the reservoir 218 also receives gaseous natural gas produced by the regasification unit 234 via gaseous natural gas fluidic coupling 246 and one or more control valves 250. In this manner, the regasification unit supplies gaseous natural gas to the reservoir 218 to, for example, maintain the reservoir at a desired storage level.

In another non-limiting example and as depicted in FIG. 2, gaseous natural gas is also supplied directly from the regasification unit 234 to the on-board engine 216 via gaseous natural gas fluidic coupling 246, control valve 250, and fluidic coupling 252. Advantageously, this configuration enables the on-board engine 216 to operate using gaseous natural gas from the regasification unit 234 independently from, or in combination with, gaseous natural gas from the reservoir 218. In another non-limiting example where gaseous natural gas is supplied directly from the regasification unit 234 to the on-board engine 216, a reservoir (such as reservoir 218) may not be utilized. In such a configuration, boil-off gas is routed directly to the on-board engine 216, and a separate starting mechanism (not shown) is utilized to start the on-board engine.

In another non-limiting embodiment, the on-board engine 216 is further configured to generate electricity that is delivered to one or more components on board the fuel tender 110 and/or on board the locomotive 100. In one example, as depicted in FIG. 2, the on-board engine 216 generates torque that is transmitted to a power conversion unit 254 via drive shaft 258. The power conversion unit 254 is configured to convert the torque into electrical energy that is delivered via electrical bus 256 to a variety of downstream electrical components in the fuel tender 110. Such components may include, but are not limited to, the regasification unit 234, tender controller 220, control valves 230, 232, 244, 248, and 250, LNG tank pressure sensor 260, LNG tank temperature sensor 264, cryogenic unit 268, batteries 272, flow meters, heating fluid temperature and pressure sensors, ambient air temperature sensors, compressors, blowers, radiators, batteries, lights, on-board monitoring systems, displays, climate controls (not shown), and the like. Additionally, in some examples and in another advantage that may be realized in the practice of some embodiments disclosed herein, electrical energy from electrical bus 256 may be provided to one or more components of the first locomotive 100, as described in more detail below.

In one example the power conversion unit 254 includes an alternator (not shown) that is connected in series to one or more rectifiers (not shown) that convert the alternator's AC electrical output to DC electrical power prior to transmission along the electrical bus 256. Based on the configuration of a downstream electrical component receiving power from the electrical bus 256, one or more inverters may be configured to invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

In some situations, the first locomotive 100 may be shifted to a shut-down mode after a specified period of engine operation and/or based on one or more engine operating conditions. In one example, an AESS routine may include monitoring of a plurality of locomotive operating parameters to verify that the operating parameters are at a desired condition. If the AESS criteria are met and the primary engine 118 is running, the engine may then be automatically shut down. In this manner, by reducing the idling time of the primary engine 118, fuel economy and reduced emission benefits may be achieved.

During shut-down conditions, it may be desirable to continue operating electronics on board the locomotive, such as an on-board locomotive monitoring system, electronics control system 134 including first locomotive controller 136, and/or other locomotive components. For example, during locomotive shut-down conditions a plurality of engine operating parameters may be monitored, and the engine may be automatically started in response to any of the plurality of monitored locomotive operating conditions falling outside a respective desired condition. Accordingly, in one non-limiting embodiment, the power conversion unit 254 of the fuel tender 110 provides electrical power via electrical bus 256 to the first locomotive 100. Such electrical power may be used, for example, to power an on-board locomotive monitoring system, operate the electronics control system 134 including first locomotive controller 136, charge batteries 148 and/or power other components on board the first locomotive. Advantageously, by utilizing power provided by the fuel tender 110, the first locomotive 100 may be maintained in a shut-down condition while continuing to operate electronic components on board the first locomotive. Accordingly, the amount of idling time of the primary engine 118 may be reduced and the locomotive system efficiency may be correspondingly increased.

Tender controller 220 on board the fuel tender 110 controls various components on board the fuel tender 110, such as the regasification unit 234, on-board engine 216, power conversion unit 254, cryogenic unit 268, control valves, and/or other components on board the fuel tender 110, by sending commands to such components. On-board tender controller 220 may also monitor fuel tender operating parameters in active operation, idle and shutdown states. Such parameters may include, but are not limited to, pressure and temperature of the LNG storage tank 212, pressure and temperature of the regasification unit 234, on-board engine 216 temperature, pressure, and load, compressor pressure, heating fluid temperature and pressure, ambient air temperature, and the like. In one example, computer readable storage media configured in the on-board tender controller 220 may execute code to auto-stop, auto-start, operate and/or tune the on-board engine 216 and regasification unit 234 in response to one or more control system routines. The computer readable storage media may also execute code to transmit to and receive communications from first locomotive controller 136 on board the first locomotive 100 and/or second locomotive controller 194 on board the second locomotive 104.

It will be appreciated that the fuel tender 110 is not limited to the components shown in the example of FIG. 2 and described above. In other examples, the fuel tender 110 may include additional or alternative components. As an example, the fuel tender may further include one or more additional sensors, flow meters, control valves, or the like.

The system of FIGS. 1-2 provide for a system of mechanically coupled rail vehicles, comprising a first rail vehicle having a first multi-fuel engine configured to fluidly couple to a tender, wherein the tender includes a fuel container containing liquefied natural gas, a regasification unit, and an on-board engine; a second rail vehicle having a second multi-fuel engine configured to fluidly couple to the tender; and a controller on board the first rail vehicle, the controller configured to request gaseous natural gas from the regasification unit and, responsive to receiving the gaseous natural gas at the first multi-fuel engine, a portion of the gaseous natural gas is sent to the second multi-fuel engine.

The regasification unit is fluidly coupled to the fuel container, is configured to receive the liquefied natural gas from the fuel container, and is further configured to vaporize the liquefied natural gas to gaseous natural gas via heat from a heated thermal fluid. The tender further includes a reservoir fluidly coupled to the regasification unit and to the on-board engine, the reservoir coupled to receive a portion of the gaseous natural gas from the regasification unit and to deliver the portion of the gaseous natural gas to the on-board engine for powering the on-board engine. The on-board engine is electrically connected to an electronic component on board the tender for providing power to the electronic component. In one example, the electronic component comprises one or more of the regasification unit or a cryogenic unit, wherein the cryogenic unit is configured to maintain the liquefied natural gas in the fuel container in a liquid phase.

The system further comprises one or more electrical energy lines that electrically connect the on-board engine to an electronic component on board the first rail vehicle and are configurable to provide power to the electronic component. The system further comprises one or more fuel lines fluidly connecting the regasification unit to the first rail vehicle. The one or more fuel lines are configurable to deliver gaseous natural gas from the regasification unit to the first rail vehicle.

Turning now to FIG. 3, an embodiment of a method 300 is illustrated for receiving fuel for use by a first vehicle. In one example, the first vehicle is a rail vehicle such as a locomotive. Fuel may be stored in a remote liquid fuel container. For example, the remote liquid fuel container may be located off-board the rail vehicle. Further, a regasification unit may convert the liquid fuel from the fuel container to a second, gaseous phase. As discussed above, in one example, the liquid fuel is LNG and the second phase of the LNG is gaseous natural gas (CNG). The regasification unit may receive heated thermal transfer fluid (e.g., water, coolant, or gas) from an engine. Additionally, the engine may use CNG to power the engine and produce electricity which may then be supplied to components on the first vehicle, the regasification unit, or other components. In one example, the liquid fuel container is the LNG storage tank 212 shown in FIG. 2 and the liquid fuel container is located on a fuel tender (e.g., fuel tender 110 shown in FIG. 2). As such, the fuel tender is mechanically coupleable to the locomotive (e.g., first vehicle). Further, in this example, the engine (e.g., on-board engine 215 shown in FIG. 2) and the regasification unit (e.g., regasification unit 234 shown in FIG. 2) are also located on the fuel tender. Advantageously, the method 300 enables heated fluid used for regasification to be generated on board the fuel tender, which obviates the need for supplying heated fluid from an external source, such as a locomotive (e.g., first rail vehicle). The following description of method 300 and other methods described below is provided with reference to the components and configuration of the exemplary fuel tender 110 and first locomotive 100 described above and shown in FIG. 2. It will be appreciated that method 300 and the other methods described below may also be performed in other contexts and environments using other suitable components and configurations.

At 302, the method 300 includes sending a request (e.g., a first request) from a first vehicle to a remote liquid fuel container to convert a portion of the fuel in the container that is in a first, liquid phase to a second, gaseous phase. As discussed above, the fuel may be natural gas and the first, liquid phase may include LNG and the second, gaseous phase may include CNG. Further, in one example, the first vehicle is a locomotive and the request is sent from the locomotive to a fuel tender mechanically coupleable to the locomotive. Thus, the remote liquid fuel container may be housed in the fuel tender. At 304, the method 300 includes delivering the fuel in the first, liquid phase from the liquid fuel container to a regasification unit. In one example, both the liquid fuel container and the regasification unit are on board the fuel tender.

At 306, the method 300 includes heating thermal transfer fluid using an engine and subsequently delivering the thermal transfer fluid to the regasification unit. In one example, the thermal transfer fluid includes one or more of coolant, water, and air. Further, in one example, the engine is an on-board engine included on the fuel tender. At 308, the method 300 includes sending a request (e.g., a second request) to deliver a portion of the fuel from the liquid fuel container in the second, gaseous phase to the engine to fuel (e.g., power) the engine. In one example, the portion of the fuel in the second, gaseous phase that fuels the engine is boil-off gas from the liquid fuel container. In one example, the liquid fuel container is the LNG storage tank 212 shown in FIG. 2. As shown in FIG. 2, the LNG storage tank 212 is fluidly coupled directly to the on-board engine 216.

At 310, the method 300 includes requesting delivery of a portion of the fuel in the second, gaseous phase from the regasification unit to a reservoir and subsequently delivering the portion of the fuel in the second, gaseous phase from the reservoir to the engine to fuel (e.g., power) the engine. As noted above, this configuration enables the reservoir 218 to maintain a threshold amount of gaseous natural gas that may be used to start and/or operate the on-board engine 216. As shown at FIG. 2, the reservoir 218 is fluidly coupled to the regasification unit 234 and receives gas from the unit. In some examples, the reservoir 218 also receives boil-off gas from the LNG storage tank 212 in addition to receiving gas from the regasification unit 234. In an alternate embodiment, the reservoir 218 may receive boil-off gas from the LNG storage tank 212 instead of receiving gas from the regasification unit 234.

In one example, the methods at 308 and 310 may occur simultaneously. For example, the first locomotive controller 136 may send a request to deliver a portion of the fuel from the liquid fuel container in the second, gaseous phase to the engine to fuel the engine while also sending a request (e.g., requesting delivery) to deliver a portion of the fuel in the second, gaseous phase from the regasification unit to a reservoir and then the engine to fuel the engine. In this way, the engine on board the fuel tender may be powered by both the above gaseous natural gas sources. In another example, only one of the methods at 308 and 310 may occur depending on engine operating conditions. For example, if a volume of the reservoir is low, fuel in the second phase may be delivered from the liquid fuel container to the engine. In another example, if no boil-off gas is present in the liquid fuel container, the fuel in the second phase may be delivered from the reservoir to the engine. In yet another example, the method at 310 may be modified such that fuel in the second phase is delivered directly from the regasification unit to the engine, thereby bypassing the reservoir.

In this way, two or more sources that may supply gaseous natural gas to the on-board engine 216 of the fuel tender 110. By providing multiple sources of gaseous natural gas, supply between or among the sources may be coordinated. In this manner, an advantage that may be realized in the practice of some embodiments is that the on-board engine 216 may utilize a variety of operating routines that may provide, for example, a ready supply of gaseous natural gas for use in starting the on-board engine 216, a backup supply of gaseous natural gas that may be used when a primary supply is empty or malfunctioning, or the like.

In some embodiments, a transition condition may trigger switching from one gaseous natural gas source to another. Examples of a transition condition include, but are not limited to, a fuel level or amount in the first source falling below or exceeding a threshold value, a pressure in the liquid fuel container, reservoir, or regasification unit falling below or exceeding a threshold value, a temperature in the liquid fuel container, reservoir, or regasification unit falling below or exceeding a threshold value, a load experienced by the on-board engine 216 falling below or exceeding a threshold value, a flow rate of LNG and/or gaseous natural gas falling below or exceeding a threshold value, or the like.

Returning to method 300, at 312, the method includes requesting electricity generation using the engine and then receiving the electricity at a first electronic component on board the first vehicle. In one example, the first vehicle is the first locomotive 100 shown in FIG. 2, and the first electronic components on board the first locomotive include one or more of compressors 140, blowers 144, batteries 148, an electronics control system 134 comprising one or more controllers 136, shutoff valves, pressure regulators, radiators, lights, on-board monitoring systems, displays, climate controls (not shown), and the like.

At 314, the method 300 includes sending a request (e.g., a third request) to deliver electricity to a second electronic component. In one example, the second electronic component includes one or both of the regasification unit and a cryogenic unit (such as cryogenic unit 268 shown in FIG. 2). As discussed above, the cryogenic unit is configured to maintain the liquid fuel container in the first, liquid phase. As noted above and depicted in FIG. 1, components receiving the generated electricity may also include, but are not limited to, tender controller 220, control valves 230, 232, 244, 248, and 250, LNG tank pressure sensor 260, LNG tank temperature sensor 264, flow meters, heating fluid temperature and pressure sensors, ambient air temperature sensors, compressors, blowers, radiators, batteries, lights, on-board monitoring systems, displays, climate controls (not shown), and the like.

Turning now to FIG. 4, another embodiment relates to a method 400 for a rail vehicle system including a source of gaseous natural gas. In one example, the source of gaseous natural gas is a fuel tender coupled to a first rail vehicle, such as fuel tender 110 shown in FIG. 2. In this example, the first rail vehicle includes the first locomotive 100 shown in FIG. 2. Specifically, the source of gaseous natural gas includes gaseous natural gas produced by a regasification unit, such as the regasification unit 234 shown in FIG. 2. As discussed above, the regasification unit converts LNG from a LNG storage container to gaseous natural gas (CNG) using heated fluid provided and generated by an engine on board the fuel tender. More specifically, in one example, the first rail vehicle described above is coupled to the second rail vehicle in a consist, and the source of the gaseous natural gas comprises: a fuel tender coupled to the first and second rail vehicles in the consist; or a regasification unit located on board the first rail vehicle that receives liquefied natural gas from the fuel tender for conversion to the gaseous natural gas.

At 402, the method 400 includes routing a first portion of the gaseous natural gas to a first engine of a first rail vehicle. In one example, the first rail vehicle is the first locomotive 100 and the first engine is the primary engine 118 shown in FIG. 2. As noted above, the first locomotive controller 136 on board the first locomotive 100 may monitor operating conditions of the primary engine 118, and may transmit a request to tender controller 220 on board the fuel tender 110 for gaseous natural gas. As a result, the first portion of gaseous natural gas may be routed to the primary engine 118. At 404, the method includes routing a second portion of the gaseous natural gas to a second engine of a second rail vehicle. In one example, the second rail vehicle is the second locomotive 104 shown in FIG. 1. Routing the second portion of the gaseous natural gas may include routing the gas through a pass through fluidic coupling 160 to a natural gas-fueled engine on board the second locomotive 104. In some embodiments, both the engine on board the second locomotive 104 and the primary engine 118 are multi-fuel engines.

At 406, the method 400 includes operating an engine on board a fuel tender to generate heated fluid. As discussed above, the engine on board the fuel tender may provide the generated heated fluid to a regasification unit on board the fuel tender. Thus, at 408, the method 400 includes sending a request to operate the regasification unit on board the fuel tender to convert liquefied natural gas to gaseous natural gas using the heated fluid. In one example, the method at 402 may include adjusting a valve, such as valve 232, to meter the gaseous natural gas produced at the regasification unit to the first locomotive 100. In another example, the method at 404 may include adjusting a valve, such as valve 156, to meter gaseous natural gas produced at the regasification unit to the second locomotive 104.

Figure 5:
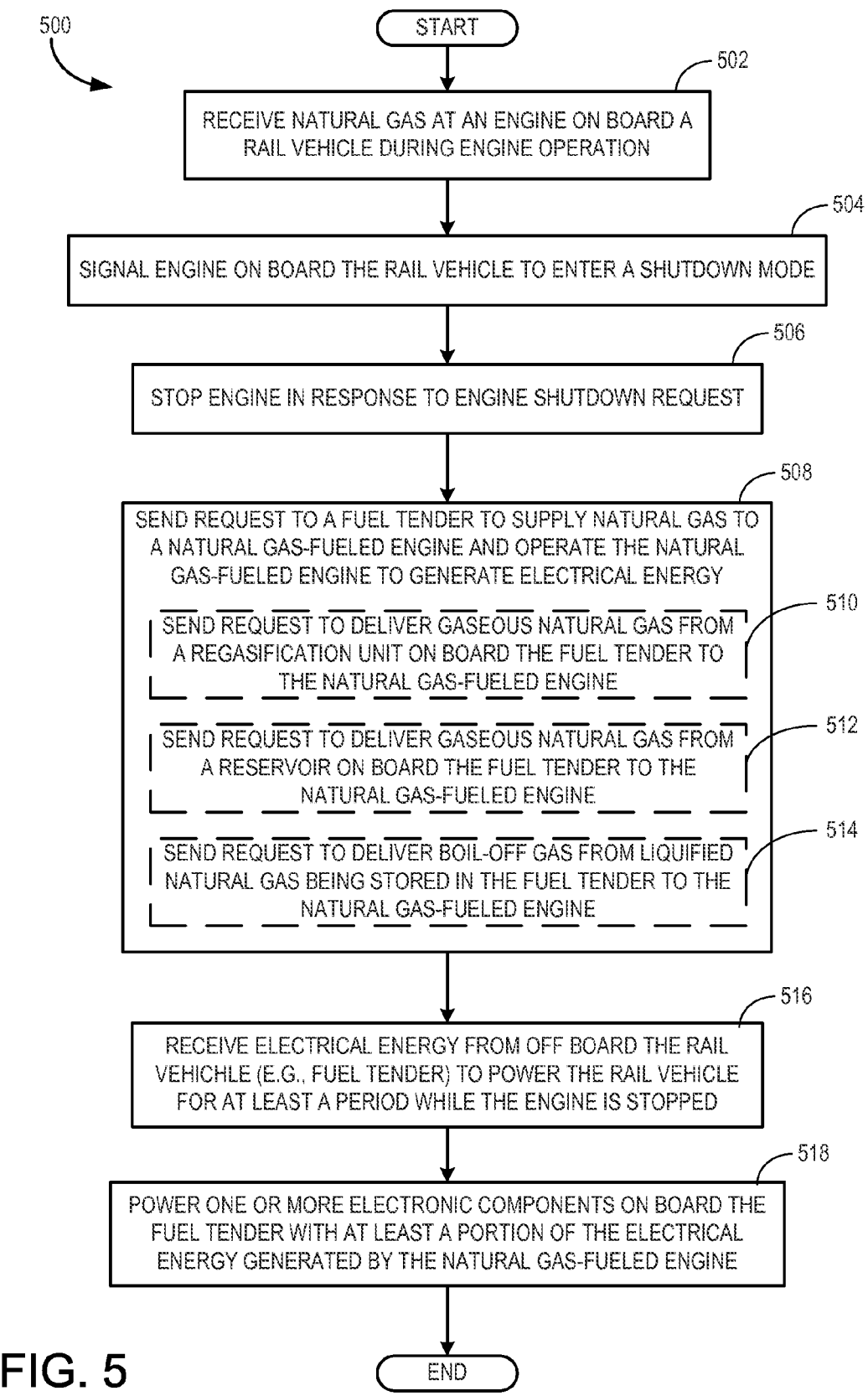
FIG. 5 shows a high level flow chart of a method for maintaining a rail vehicle according to an embodiment of the present disclosure.

With reference now to FIG. 5, another embodiment relates to a method 500 for maintaining a rail vehicle, such as a locomotive, including an engine. In one example, the locomotive engine may be stopped to enter a shutdown mode. Electricity for powering one or more auxiliary loads on board the locomotive, normally generated by the locomotive engine, may be supplied by an engine on board a fuel tender. In this manner, an advantage that may be realized in the practice of some embodiments is that the locomotive engine may be maintained in a shutdown mode for an extended period, while also receiving electricity to power auxiliary loads and components on board the locomotive from an engine on board the fuel tender. Accordingly, by facilitating idle time reduction of the locomotive engine, fuel economy and reduced emissions benefits may be achieved.

At 502 the method 500 includes receiving natural gas at an engine on board a rail vehicle during engine operation. In one example, the rail vehicle is the first locomotive 100 and the engine is the primary engine 118 shown in FIG. 2. As discussed above, the engine may be a multi-fuel engine using natural gas, diesel, and/or other fuels. Also as discussed above with reference to FIGS. 1-4, the engine may receive gaseous natural gas from a fuel tender, the fuel tender including a regasification unit for producing the gaseous natural gas.

At 504 the method 500 includes signaling the engine on board the rail vehicle to enter a shutdown mode. In one example, signaling the engine includes sending a signal or request from a controller on board the rail to the engine. In response to the engine shutdown request, the method 500 includes stopping the engine at 506.

At 508 the method 500 includes sending a request off board the rail vehicle to supply natural gas to a natural gas-fueled engine. The method further includes operating a natural gas-fueled engine to generate electrical energy. In one example, the natural gas-fueled engine is off board the rail vehicle and may be referred to as an off board engine. In another example, the natural gas-fueled engine is off board the rail vehicle and on board a fuel tender. In this example, the natural gas-fueled engine is the on-board engine 216, on board the fuel tender 110, as shown in FIG. 2. In this example, sending the request at 508 includes sending the request to the fuel tender to supply natural gas to the natural gas-fueled engine. In another example, the request sent at 508 includes sending, or transmitting, a request for electricity generation to the natural gas-fueled engine. As discussed above, the natural gas-fueled engine is fluidly coupled to one or more fuel sources.

In a first example, sending the request at 508 includes sending a request to deliver gaseous natural gas from a regasification unit on board the fuel tender to the natural gas-fueled engine at 510. The natural gas-fueled engine then generates electricity by powering the natural gas-fueled engine with the gaseous natural gas received from the regasification unit. In a second example, sending the request at 508 includes sending a request to deliver gaseous natural gas from a reservoir on board the fuel tender to the natural gas-fueled engine at 512. The natural gas-fueled engine then generates electricity by powering the natural gas-fueled engine with the gaseous natural gas received from the reservoir. In a third example, the request at 508 includes sending a request to deliver boil-off gas from liquefied natural gas being stored in the fuel tender to the natural gas-fueled engine at 514. The natural gas-fueled engine then generates electricity by powering the natural gas-fueled engine with boil-off gas from liquefied natural gas. In one example, the liquefied natural gas is stored in a LNG storage tank, such as the LNG storage tank 212 shown in FIG. 2, and the boil-off gases come from the LNG storage tank.

At 516 the method 500 includes receiving electrical energy from off board the rail vehicle to power the rail vehicle for at least a period while the engine is stopped. In one example, off board the rail vehicle includes the fuel tender and the electrical energy is received from the natural gas-fueled engine on board the fuel tender. Specifically, receiving the electrical energy includes receiving at least a portion of the electrical energy generated by the natural gas-fueled engine. The method at 516 further includes powering one or more auxiliary loads or electronic components on board the rail vehicle (e.g., first locomotive 100 shown in FIG. 2) with at least the portion of electrical energy received from the fuel tender. The one or more auxiliary loads or electronic components include at least one or more of a compressor, a blower, a battery, a traction motor, a compressed air unit, a radiator fan, an electronic control system, a lighting system, a sensor, a communication system, safety equipment (e.g., a positive train control or collision avoidance system), an energy storage unit, and a controller. Further, the method at 516 may include maintaining an electronic control system of the rail vehicle in an active state during the shutdown mode.

At 518 the method 500 includes powering one or more electronic components on board the fuel tender with at least a portion of the electrical energy generated by the natural gas-fueled engine. The one or more electronic components include one or more of the regasification unit and a cryogenic unit. The electronic components may also include a controller, valve, sensor, or the like, on board the fuel tender.

In this way, an embodiment relates to a method comprising receiving natural gas at an engine on board a first rail vehicle during engine operation, stopping the engine in response to an engine shutdown request, and receiving electrical energy from off board the first rail vehicle to power the first rail vehicle for at least a period while the engine is stopped. In another embodiment, the engine shutdown request is an automatic engine shutdown request initiated onboard the first rail vehicle, and the electrical energy is received from a second rail vehicle coupled to the first rail vehicle. (The automatic engine shutdown request may result responsive to the occurrence of one or more designated operational criteria of the rail vehicle, and does not include the situation of an operator of the rail vehicle turning the vehicle off.) In another embodiment, the second rail vehicle is a fuel tender car, and the electrical energy is generated by an on board engine of the fuel tender car, which is powered by natural gas carried by the fuel tender car.

Figure 6:
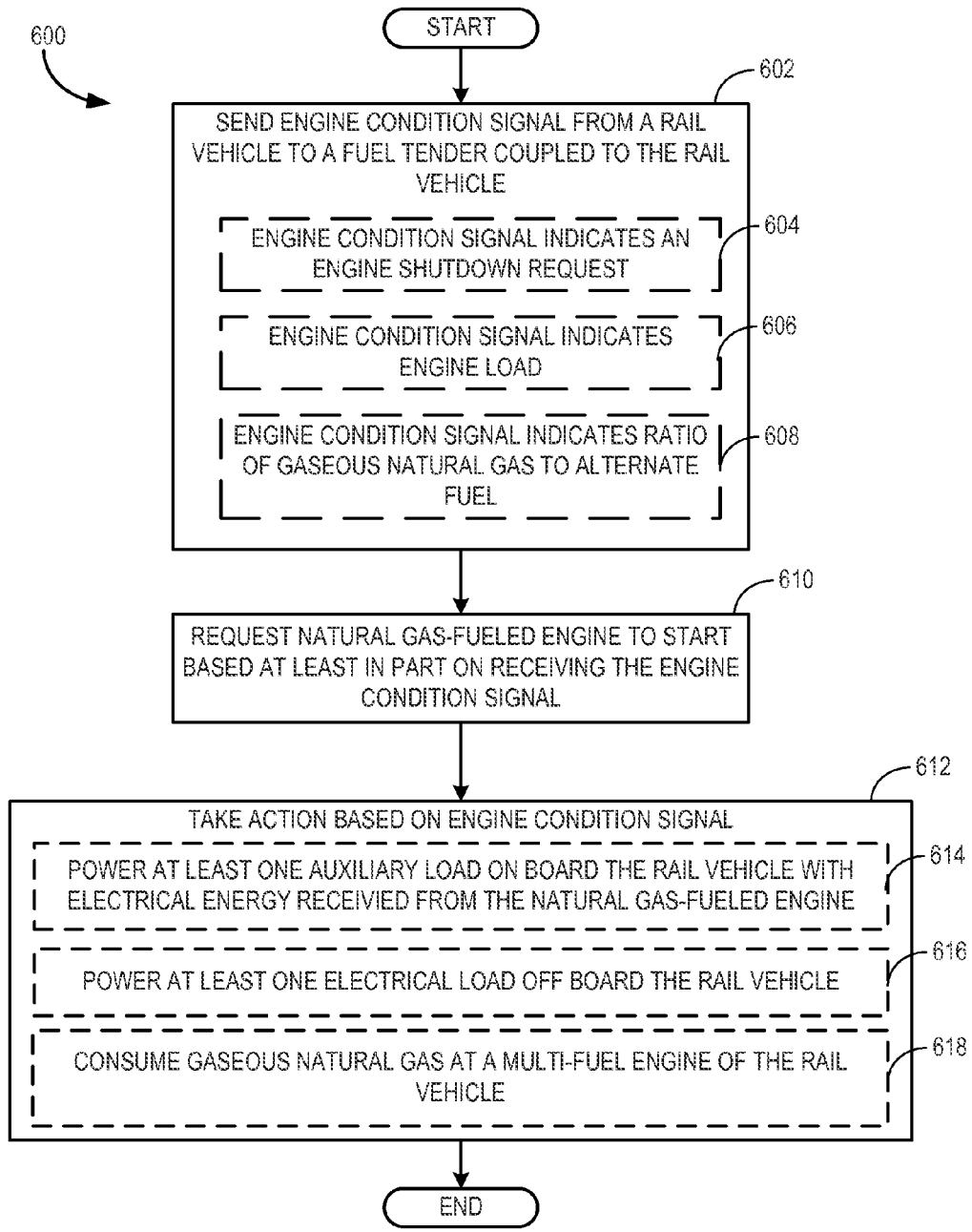
FIG. 6 shows a high level flow chart of another method for maintaining a rail vehicle according to an embodiment of the present disclosure.

With reference now to FIG. 6, a method 600 for maintaining a rail vehicle in response to various engine condition signals is presented. The method 600 includes sending engine condition signals from a rail vehicle to a fuel tender coupled to the rail vehicle. Based on the engine condition signals, components on board the fuel tender maybe operated to generate gaseous natural gas and/or generate electrical energy which may then be supplied to the rail vehicle. In one example, the rail vehicle is the first locomotive 100 and the fuel tender is the fuel tender 110 shown in FIGS. 1-2.

At 602 the method 600 includes sending an engine condition signal from the rail vehicle to the fuel tender coupled to the rail vehicle. In one example, at 604 the engine condition signal indicates an engine shutdown request. For example, the engine shutdown request may correspond to shutting down the primary engine 118 of the first locomotive shown in FIG. 2. In another example, at 606 the engine condition signal indicates an engine load. For example, the engine load may be an engine load experienced by the dual or multi fuel primary engine 118 of the first locomotive 100. In yet another example, at 608 the engine condition signal indicates a ratio of gaseous natural gas to alternate fuel. As noted above, in one example the primary engine 118 may comprise a multi fuel engine that utilizes gaseous natural gas and an alternate fuel, such as diesel fuel, for combustion. The primary engine 118 may operate using ratios of gaseous natural gas and the alternate fuel that may vary depending upon one or more engine conditions. Accordingly, in some examples the electronics control system 134 may communicate to the fuel tender 110 a desired ratio of gaseous natural gas to alternate fuel. Thus, in some examples, the method at 608 includes adjusting the ratio of diesel fuel to gaseous natural gas. Other engine condition signals that may be received in other examples include, but are not limited to, manifold air temperature (MAT), ambient air temperature, engine oil temperature, compressor air pressure, main air reserve pressure, battery voltage, a battery state of charge, brake cylinder pressure, or the like.

At 610 the method 600 includes requesting the natural gas-fueled engine to start based at least in part on receiving the engine condition signal. At 612 the method 600 includes taking action based on the engine condition signal. In one example, in response to an engine shutdown signal, or other engine condition signal, the method at 614 includes powering at least one auxiliary load on board the rail vehicle with electrical energy received from the natural gas-fueled engine. The at least one auxiliary load includes one or more of an electronics control system, a blower, a traction motor, a compressed air unit, a radiator fan, a lighting system, a collision avoidance or positive train control system, safety equipment, communication equipment, a sensor, and an energy storage unit.

In another example, in response to the engine condition signal, the method at 616 includes powering at least one electrical load off board the rail vehicle. The powering the at least one electrical load off board the rail vehicle includes at least one of electrically heating a regasification unit and cryogenically maintaining liquefied natural gas. For example, in response to the engine condition, the cryogenic unit 268 and/or the on-board engine 216 may be powered. Further, the regasification unit may also be powered at 616.

In yet another example, in response to the engine condition signal, the method at 618 includes consuming gaseous natural gas at a multi-fuel engine of the rail vehicle (e.g., the primary engine 118 of the first locomotive 100). The method at 618 may further include heating thermal fluid using the natural gas-fueled engine and regasifying liquefied natural gas to form the gaseous natural gas using the heated thermal fluid. In some examples, the actions at 618 may be in response to the engine condition signal indicating an increased engine load and/or a larger ratio of gaseous natural gas to alternate fuel.

In this way, in an embodiment, a method comprises sending an engine condition signal from a rail vehicle to a fuel tender coupled to the rail vehicle, requesting a natural gas-fueled engine to start based at least in part on receiving the engine condition signal, and powering at least one auxiliary load on board the rail vehicle with electrical energy received from the natural gas-fueled engine. In another embodiment, the natural gas-fueled engine is on board the fuel tender vehicle.

In an embodiment, the on-board engine 216 may be started in response to an LNG tank 212 condition signal received by the tender controller 220. The LNG tank 212 condition signal may comprise, for example, a pressure, temperature, LNG amount or level, or boil-off gas amount or level. In one example, the pressure in the LNG tank 212 may be detected to exceed a predetermined threshold. If the on-board engine 216 is not operating, the on-board engine may be started and boil-off gas may be released from the LNG tank 212 and delivered via fluidic coupling 242 to the on-board engine. Advantageously, in this manner the on-board engine 216 may function as a pressure-relief mechanism to maintain the LNG tank 212 at or below a desired pressure. It will also be appreciated that in some examples the electricity generated by the on-board engine 216 may be stored in energy storage devices, such as batteries 272 on board the fuel tender and/or batteries 148 on board the first locomotive 100.

In an embodiment, the on-board engine 216 of the fuel tender 110 may comprise an air-cooled combustion engine that supplies heated air via fluidic coupling 240 to the regasification unit 234 for use in vaporizing LNG to gaseous natural gas. In other embodiments, such as in any of the other embodiments described herein, the on-board engine 216 of the fuel tender 110 may comprise a water-cooled combustion engine that supplies heated water via fluidic coupling 238 to the regasification unit 234 for use in vaporizing LNG to gaseous natural gas. In still other embodiments, such as in any of the other embodiments described herein, the on-board engine 216 of the fuel tender 110 may comprise a water-cooled combustion engine that supplies both heated water and heated air via fluidic couplings 238 and 240, respectively, to the regasification unit 234 for use in vaporizing LNG to gaseous natural gas.

In an embodiment, the on-board engine 216 may be controlled to only supply heated fluid to the regasification unit 234, and not to generate torque that is transmitted to the power conversion unit 254. In one example, a clutch may disengage the drive shaft 258 from the on-board engine 216 such that the on-board engine output is used solely to supply heated fluid to the regasification unit.

In an embodiment, the on-board engine 216 may be controlled to supply heated fluid to the regasification unit 234 and to generate torque that is transmitted to a power conversion unit 254 via drive shaft 258. As noted above, the power conversion unit 254 is configured to convert the torque into electrical energy that is delivered via electrical bus 256 to a variety of downstream electrical components in the fuel tender 110. In one example, the on-board engine 216 may be tuned to generate a maximum amount of heated fluid such as, for example, via retarded spark timing. In this manner, operation of the on-board engine 216 may be controlled to enable the regasification unit 234 to vaporize and deliver a maximum amount of gaseous natural gas to the first locomotive 100. It will be appreciated that in this example, the amount of torque imparted to the drive shaft 258 may be less than an amount of torque that may be imparted via other tunings of the on-board engine 216 that do not prioritize generation of heated fluid.

In another example, the on-board engine 216 may be tuned to impart a maximum amount of torque to the drive shaft to generate a corresponding maximum amount of electricity via the power conversion unit 254. In this manner, operation of the on-board engine 216 may be controlled to maximize the amount of electricity delivered to various components on board the fuel tender 110 and/or to components on board the first locomotive 100 and/or other rail vehicles. It will be appreciated that in this example, the amount of heated fluid generated by the on-board engine 216 may be less than an amount of heated fluid that may be generated via other tunings of the on-board engine 216 that do not prioritized generation of electricity.

In an embodiment, the on-board engine 216 may receive boil-off gas from the storage tank 212. The boil-off gas may power the on-board engine to generate electricity, even when such electricity may not be used by an on-board or off-board load. The electricity may then be dissipated in a resistive grid as heat, or may be stored in batteries 272 on board the fuel tender 110, batteries 148 on board the locomotive 100, or other batteries off-board the fuel tender. In this manner, venting of the boil-off gas to atmosphere may be avoided, and additional energy storage in batteries may also be realized. More specifically, in at least one mode of operation where the on-board engine 216 is operational (that is, functional), the on-board engine receives all the boil-off gas from the storage tank 212, and in effect converts the boil-off gas (through combustion) into electricity, which is used to power loads and/or stored in batteries, and with any excess generated electricity being dissipated in one or more resistive grids as heat, such that no boil-off gas is vented to atmosphere. The one or more resistive grids may be on board the tender, and/or resistive grids on rail vehicles coupled to the tender may be utilized for this purpose. A mode of operation may be provided wherein the boil-off gas is vented to atmosphere if the on-board engine 216 is nonfunctional (e.g., a safety valve that triggers, to vent the boil-off gas to atmosphere, when a pressure of the boil-off gas exceeds an operational pressure threshold of the safety valve, wherein when the on-board engine is functioning properly, the pressure of the boil-off gas is kept below the operational pressure threshold of the safety valve). Thus, in an embodiment, a method comprises, in a fuel tender vehicle, combusting all boil-off gas of a liquid fuel reservoir of the fuel vehicle in an on-board engine of the fuel tender when the on-board engine is not malfunctioning, and venting the boil-off gas to atmosphere when the on-board engine is malfunctioning. In another embodiment, a method comprises, in a fuel tender vehicle, combusting all boil-off gas of a liquid fuel reservoir of the fuel vehicle in an on-board engine of the fuel tender when the on-board engine is not malfunctioning, and, when the on-board engine is malfunctioning, storing the boil-off gas in a second reservoir and venting the boil-off gas to atmosphere when the second reservoir is full.

In another embodiment, the primary engine 118 of the first locomotive 100 may comprise a single fuel engine that is powered by gaseous natural gas received from the fuel tender 110.

In this written description, references to "one embodiment" or "an embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," or the like. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods.

The invention claimed is:

1. A method, comprising:
   with a controller of a locomotive, sending a signal to a controller of a fuel tender to operate a natural-gas fueled engine on-board the fuel tender, transmit torque from the engine on-board the fuel tender to a power conversion unit on-board the fuel tender via a drive shaft to generate electrical energy at the power conversion unit, supply the electrical energy to the locomotive, supply heated fluid generated by the engine on-board the fuel tender to a regasification unit on-board the fuel tender, convert liquefied natural gas to gaseous natural gas at the regasification unit using the heated fluid, and deliver the gaseous natural gas to an engine on-board the locomotive via a fluidic coupling.

2. The method of claim 1, wherein the regasification unit generates the natural gas supplied to the engine on-board the fuel tender.

3. The method of claim 1, further comprising operating the engine on-board the locomotive with the received gaseous natural gas.

4. The method of claim 1, wherein the locomotive is a first locomotive, the method further comprising passing the received gaseous natural gas through a pass-through fluidic coupling from the first locomotive to a second locomotive.

5. The method of claim 1, further comprising sending a signal from the controller of the locomotive to the controller of the fuel tender to power the engine on-board the fuel tender with boil-off gas from liquefied natural gas stored in the fuel tender.

6. The method of claim 1, further comprising sending a signal from the controller of the locomotive to the controller of the fuel tender to power the engine on-board the fuel tender with gaseous natural gas received from a reservoir on-board the fuel tender.

7. The method of claim 1, further comprising sending a signal from the controller of the locomotive to the controller of the fuel tender to power the engine on-board the fuel tender with gaseous natural gas received from the regasification unit.

8. The method of claim 1, further comprising, in a first mode, sending a signal from the controller of the locomotive to the controller of the fuel tender to tune operation of the engine on-board the fuel tender to prioritize generation of heated fluid over generation of electricity by retarding spark timing.

9. The method of claim 8, further comprising, in a second mode, sending a signal from the controller of the locomotive to the controller of the fuel tender to tune operation of the engine on-board the fuel tender to prioritize the generation of electricity over the generation of heated fluid.

10. A method for maintaining a locomotive including an engine, comprising:
    stopping the locomotive engine to enter a shutdown mode of the locomotive engine;
    transmitting a request for electricity to a fuel tender;
    receiving, at the locomotive, electricity generated at a power conversion unit on-board the fuel tender, the power conversion unit generating the electricity with torque received from an engine on-board the fuel tender, the engine on-board the fuel tender powered with boil-off gas from liquefied natural gas stored in the fuel tender; and
    using the electricity to power at least one auxiliary load on-board the locomotive.

11. The method of claim 10, wherein the at least one auxiliary load includes one or more of a blower, a traction motor, a compressed air unit, a radiator fan, an electronics control system, a lighting system, a sensor, or an energy storage unit.

12. The method of claim 10, further comprising maintaining an electronics control system of the locomotive active during the shutdown mode.

13. A method, comprising:
    sending an engine condition signal from a controller of a locomotive to a controller of a fuel tender, the engine condition signal comprising a request to initiate starting of an engine on-board the fuel tender, generate heated fluid using the engine on-board the fuel tender, convert liquefied natural gas to gaseous natural gas at a regasification unit on-board the fuel tender using the heated fluid, and deliver the gaseous natural gas to an engine on-board the locomotive via a fluidic coupling.

14. The method of claim 13, wherein the engine condition signal indicates a shutdown of the engine on-board the locomotive and further comprises a request to transmit torque from the engine on-board the fuel tender to a power conversion unit on-board the fuel tender via a drive shaft to generate electrical energy at the power conversion unit and supply the electrical energy to the locomotive.

15. The method of claim 13, wherein the engine condition signal comprises an engine load signal.

16. The method of claim 13, wherein the engine condition signal comprises a ratio of gaseous natural gas to an alternate fuel.

17. The method of claim 16, wherein the alternate fuel comprises diesel fuel.

18. The method of claim 13, wherein the engine on-board the locomotive is a dual fuel engine.

19. The method of claim 13, further comprising sending a signal from the controller of the locomotive to the controller of the fuel tender to power the engine on-board the fuel tender with boil-off gas from liquefied natural gas stored on-board the fuel tender.

* * * * *